US012614468B2

(12) United States Patent
Agrawal

(10) Patent No.: US 12,614,468 B2
(45) Date of Patent: Apr. 28, 2026

(54) UNMANNED AERIAL VEHICLE ENTRY INTO A GEOFENCED AREA

(71) Applicant: THE BOEING COMPANY, Arlington, VA (US)

(72) Inventor: Rajat Agrawal, Denver, CO (US)

(73) Assignee: THE BOEING COMPANY, Arlington, VA (US)

( * ) Notice: Subject to any disclaimer, the term of this patent is extended or adjusted under 35 U.S.C. 154(b) by 261 days.

(21) Appl. No.: 18/168,660

(22) Filed: Feb. 14, 2023

(65) Prior Publication Data

US 2024/0274016 A1 Aug. 15, 2024

(51) Int. Cl.
| | |
|---|---|
| *G08G 5/00* | (2025.01) |
| *B64U 10/00* | (2023.01) |
| *G08G 5/26* | (2025.01) |
| *G08G 5/55* | (2025.01) |
| *G08G 5/57* | (2025.01) |
| *G08G 5/59* | (2025.01) |
| *H04W 4/021* | (2018.01) |
| *B64U 101/30* | (2023.01) |
| *B64U 101/60* | (2023.01) |

(52) U.S. Cl.
CPC ............... *G08G 5/55* (2025.01); *B64U 10/00* (2023.01); *G08G 5/26* (2025.01); *G08G 5/57* (2025.01); *G08G 5/59* (2025.01); *H04W 4/021* (2013.01); *B64U 2101/30* (2023.01); *B64U 2101/60* (2023.01)

(58) Field of Classification Search
CPC .... G08G 5/006; G08G 5/0013; G08G 5/0069; B64U 10/00; B64U 2101/00; B64U 2101/30; B64U 2101/60; H04W 4/021; H04W 4/029
See application file for complete search history.

(56) References Cited

U.S. PATENT DOCUMENTS

| | | | | |
|---|---|---|---|---|
| 2006/0294387 | A1* | 12/2006 | McCracken | ............ G06F 21/43 |
| | | | | 713/182 |
| 2012/0240195 | A1* | 9/2012 | Weiss | .................. H04L 63/0853 |
| | | | | 726/4 |
| 2016/0225264 | A1* | 8/2016 | Taveira | ................ G06Q 20/085 |
| 2017/0169713 | A1* | 6/2017 | Gong | ........................ G08G 5/26 |

(Continued)

FOREIGN PATENT DOCUMENTS

| | | | | |
|---|---|---|---|---|
| EP | 3633653 | B1 * | 3/2021 | ............... G08G 5/57 |

*Primary Examiner* — Erin M Piateski
*Assistant Examiner* — Hajar Hassaniardekani
(74) *Attorney, Agent, or Firm* — Moore Intellectual Property Law, PLLC

(57) ABSTRACT

An unmanned aerial vehicle includes a propulsion system, a processor, a transmitter and a receiver coupled to the processor, and a memory coupled to the processor. The memory includes instructions executable by the processor to perform operations. The operations include, in response to a determination that the unmanned aerial vehicle is near a boundary of a geofenced area associated with a destination location of the unmanned aerial vehicle, sending an access request, via the transmitter, to an access controller associated with the geofenced area. The operations include receiving, via the receiver in response to the access request, access permission. The operations also include, responsive to receiving the access permission, engaging the propulsion system to proceed across the boundary.

20 Claims, 4 Drawing Sheets

(56)        References Cited

U.S. PATENT DOCUMENTS

2017/0278404 A1*  9/2017  Gordon .................. G08G 5/006
2017/0316701 A1*  11/2017  Gil ........................... B60P 3/11
2018/0183835 A1*  6/2018  Bryant ................. H04W 12/08
2018/0197420 A1*  7/2018  Banga ..................... G01S 15/74
2023/0154266 A1*  5/2023  Carter ................... G06V 20/52
                                                      340/541

* cited by examiner

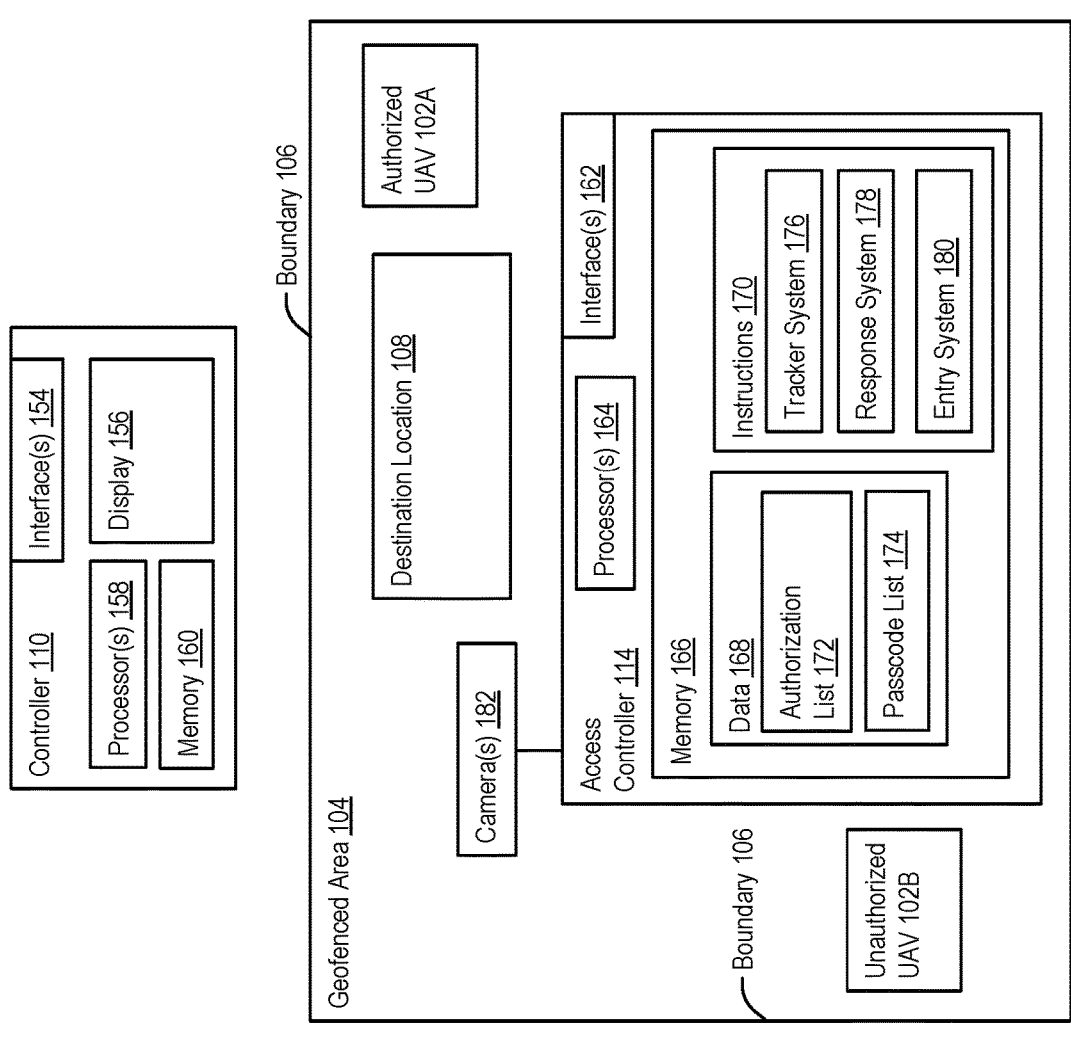
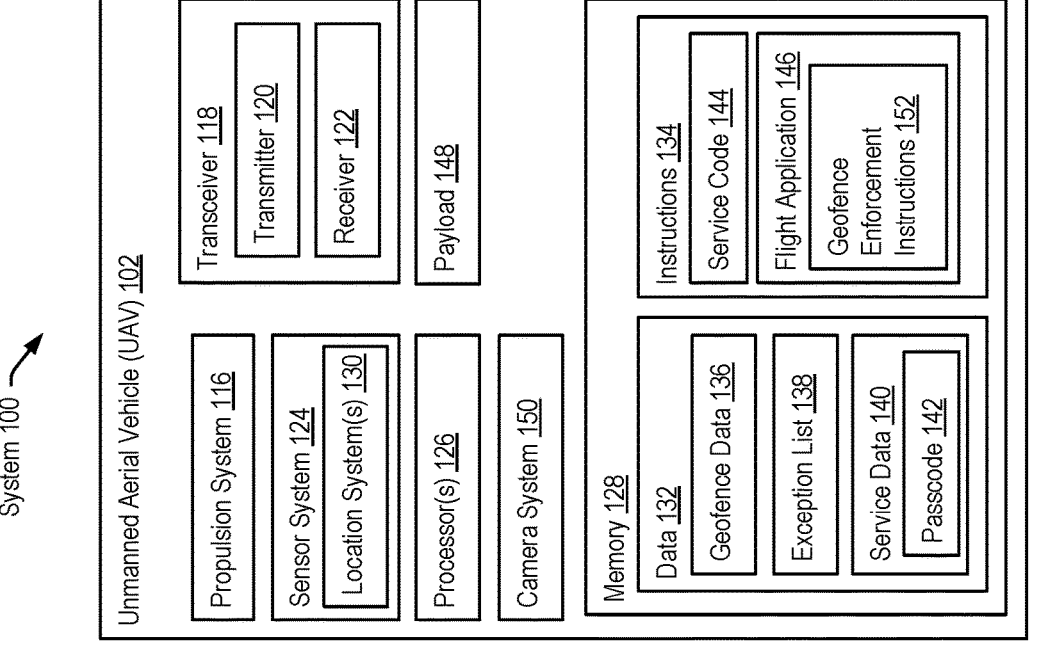
FIG. 1

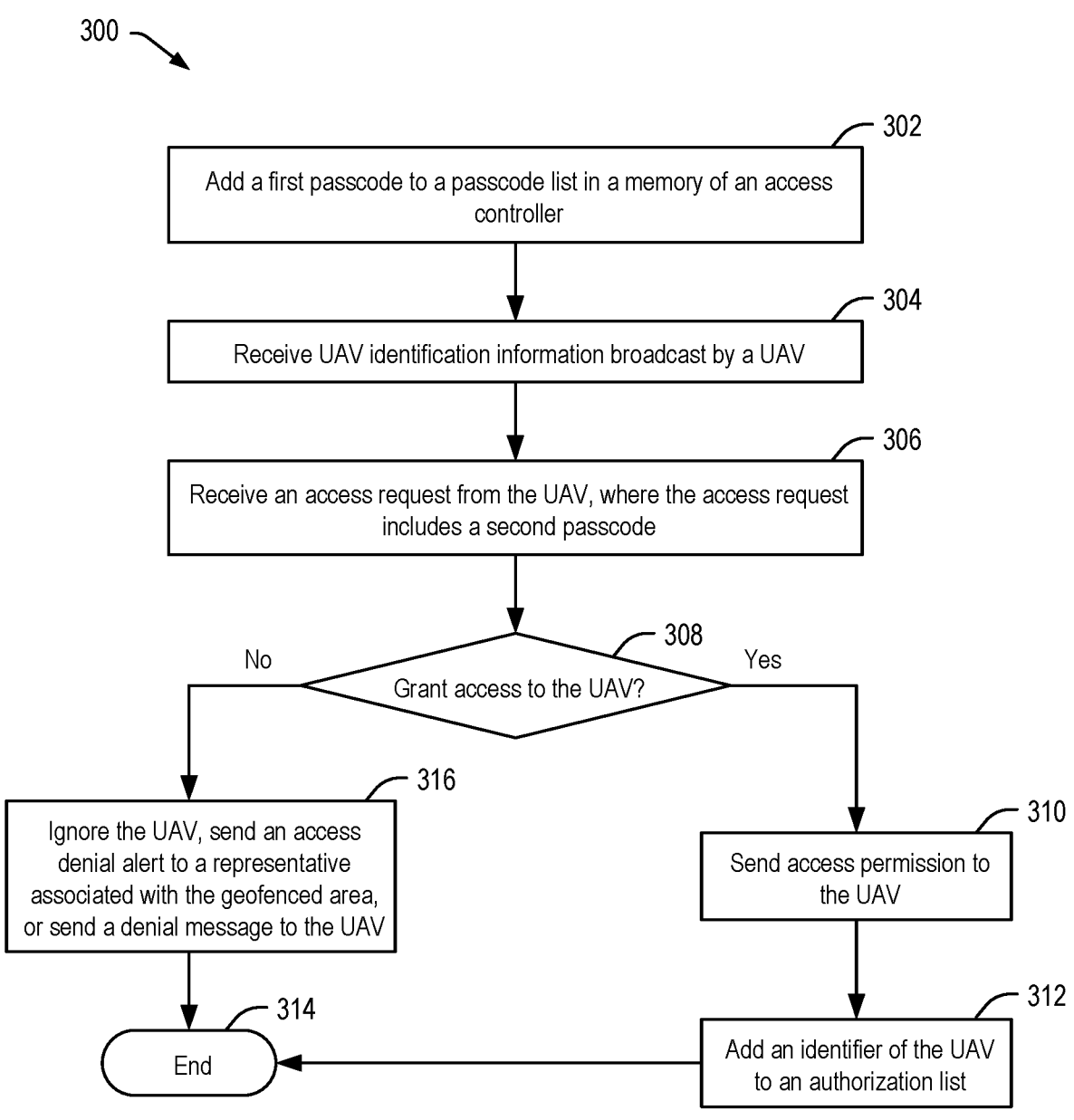

300

302
Add a first passcode to a passcode list in a memory of an access controller

304
Receive UAV identification information broadcast by a UAV

306
Receive an access request from the UAV, where the access request includes a second passcode 308
Grant access to the UAV?

No

Yes

316
Ignore the UAV, send an access denial alert to a representative associated with the geofenced area, or send a denial message to the UAV 310
Send access permission to the UAV 312
Add an identifier of the UAV to an authorization list 314
End

Computing Device 402

System Memory 406

Operating System 414

Applications (e.g., Instructions) 416

Processor(s) 404

Storage Device(s) 408

Communications Interface(s) 412

Input/Output Interface(s) 410

Input/Output Device(s) 418

Device(s) 420

UNMANNED AERIAL VEHICLE ENTRY INTO A GEOFENCED AREA

FIELD OF THE DISCLOSURE

The present disclosure is related to systems and methods for providing an unmanned aerial vehicle entry into a geofenced area.

BACKGROUND

Governmental entities associated with flight may require unmanned aerial vehicles (UAVs) to include a transmitter that broadcasts identification information of the UAV or may require a controller associated with a UAV to broadcast identification information. Additionally, the governmental entities associated with flight may establish rules associated with areas where UAVs can and cannot be operated. The governmental entities may cause data that defines geofences around restricted areas to be made available to operators of UAVs as geofence data. Flight in restricted areas defined by geofences may be prohibited or limited (e.g., temporal limits, elevation limits, etc.). Restricted areas may include fixed areas and temporary areas. Fixed areas may include military bases, national parks, airports, prisons, utility facilities (power plants, water treatment facilities, etc.), hospitals, schools, manufacturing facilities, etc. Temporary areas may include areas where natural disasters occurred (e.g., hurricanes, earthquakes, forest fires, floods, etc.), areas where public events are occurring (e.g., parades, concerts, sporting events, etc.), areas near a crime scene or accident, etc. Some UAVs are authorized to fly in particular restricted areas and procedures exist for obtaining permission to use UAVs within some restricted areas.

Some UAVs are manufactured so that software, hardware, or both, of a UAV causes the UAV to retrieve geofence information for a region where the UAV is capable of flying based on a location of the UAV. The geofence information can be used by the UAV to prevent the UAV from crossing a boundary of a geofenced area during flight or to prevent the UAV from initiating flight if the UAV is an unauthorized UAV located in the geofenced area. Other UAVs do not include software, hardware, or both, that prevents a UAV from crossing a boundary of a geofenced area or from initiating a flight when the UAV is an unauthorized UAV in a geofenced area. Such a UAV may provide a warning to an operator if the UAV is approaching a boundary of a geofence or is to initiate flight in a geofenced area. In general, it is a responsibility of a UAV operator to not allow the UAV to enter into a geofenced area when the UAV is not an authorized UAV. Entry of a UAV into a geofenced area may result in fines assessed to an owner of the UAV, loss of a license to use a UAV, capture of the UAV, trespass actions, or combinations thereof. It is desirable for a UAV that has a destination in a geofenced area associated with an access controller to communicate with the access controller to get permission to enter the geofenced area.

SUMMARY

According to one implementation of the present disclosure, an unmanned aerial vehicle includes a propulsion system, a processor, a transmitter and a receiver coupled to the processor, and a memory coupled to the processor. The memory includes instructions executable by the processor to perform operations. The operations include, in response to a determination that the unmanned aerial vehicle is near a boundary of a geofenced area associated with a destination location of the unmanned aerial vehicle, sending an access request, via the transmitter, to an access controller associated with the geofenced area. The operations include receiving, via the receiver in response to the access request, access permission. The operations also include, responsive to receiving the access permission, engaging the propulsion system to proceed across the boundary.

According to another implementation of the present disclosure, a method includes, in response to a determination, by a processor of an unmanned aerial vehicle, that the unmanned aerial vehicle is near a boundary of a geofenced area associated with a destination of the unmanned aerial vehicle, sending an access request to an access controller associated with the geofenced area. The method includes receiving, at a receiver of the unmanned aerial vehicle, access permission. The method also includes, responsive to receiving the access permission, causing the unmanned aerial vehicle to enter the geofenced area.

According to another implementation of the present disclosure, a non-transitory computer medium includes instructions executable by one or more processors of an unmanned aerial vehicle. The instructions cause the one or more processors to, in response to a determination that the unmanned aerial vehicle is near a boundary of a geofenced area associated with a destination of the unmanned aerial vehicle, send an access request, via a transmitter of the unmanned aerial vehicle, to an access controller associated with the geofenced area. The instructions cause the one or more processors to receive, from a receiver of the unmanned aerial vehicle, access permission. The instructions further cause the one or more processors to, responsive to receipt of the access permission, engage a propulsion system to proceed across the boundary.

According to another implementation of the present disclosure, an unmanned aerial vehicle includes means to propel the unmanned aerial vehicle. The unmanned aerial vehicle includes communication means to send and receive data. The unmanned aerial vehicle includes means to determine that the unmanned vehicle is near a boundary of a geofenced area associated with a destination location of the unmanned aerial vehicle. The unmanned aerial vehicle includes means to cause the communication means to send an access request to an access controller associated with the geofenced area responsive to the means to determine indicating that the unmanned aerial vehicle is near the boundary. The unmanned aerial vehicle includes means to receive from the communication means access permission. The unmanned aerial vehicle also includes means to cause the means to propel the aircraft to proceed across the boundary.

The features, functions, and advantages that have been described can be achieved independently in various implementations or may be combined in yet other implementations, further details of which are disclosed with reference to the following description and drawings. The drawings are conceptual and not drawn to scale.

BRIEF DESCRIPTION OF THE DRAWINGS

FIG. 1 is a block diagram of a system that enables a UAV to get permission to enter a geofenced area from an access controller associated with the geofenced area.

FIG. 3 is a flowchart of a process for an access controller to determine whether to grant or deny an unmanned aerial vehicle access to a geofenced area associated with the access controller.

DETAILED DESCRIPTION

Figure 2:
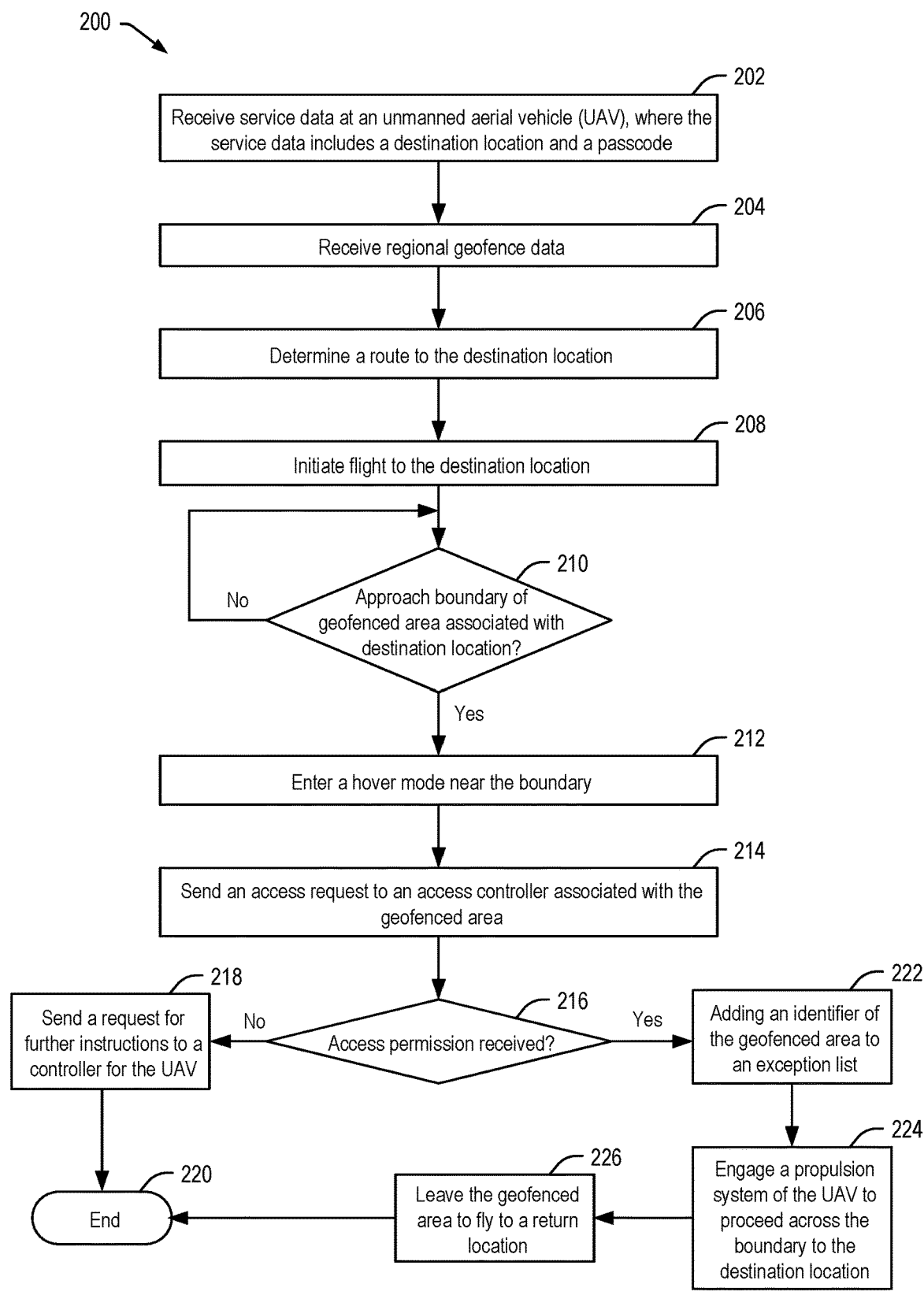
FIG. 2 is a flowchart of a process for an unmanned aerial vehicle to receive permission to enter a geofenced area from an access controller associated with the geofenced area.

An unmanned aerial vehicle (UAV) may be used to transport humans and/or cargo, provide surveillance of a structure or a location, and provide other types of services. Places where a UAV can fly may be restricted by boundaries of one or more geofenced areas. Boundaries of geofenced areas are virtual obstructions that define a boundary of a geofenced area where particular rules governing the operation of UAVs exist. Regional geofence data that defines geofenced areas may be accessed from a database and local geofence data that defines local geofenced areas may be broadcast by one or more access controllers associated with the local geofenced areas.

An access controller may be used to control access to a geofenced area. In some implementations, the access controller may include a list of UAVs that are allowed entry to the geofenced area associated with the access controller. In some aspects, an access controller may broadcast a signal that defines a portion of a local geofenced area, time restrictions associated with the local geofenced area, other information, or combinations thereof. The local geofenced area may define a geofenced area not included in the regional geofence data. An access controller associated with a geofenced area may receive identification information of UAVs, code signals from the UAVs, access requests from the UAVs, or combinations thereof. The access controller may keep a log of such information and video of unauthorized UAVs in the geofenced area. The code signals may indicate that the UAV is associated with a first response unit or law enforcement. Such a UAV may be considered by the access controller to be an authorized UAV. The access controller may report unauthorized UAVs that enter the geofenced area to an appropriate entity.

A UAV may be associated with a start location and the UAV may be used to provide a service at a destination location in an operational range of the UAV. The operation range associated with the UAV allows the UAV to travel from the start location to the destination location and allows the UAV to return to a return location. The return location may be the start location or a different location. For some implementations, the UAV is transported by a person or vehicle to the start location. For other implementations, transport of the UAV to the start location is not needed.

A service to be provided by a UAV may be ordered. A destination for the service may be located in a geofenced area. When the service is ordered, a passcode associated with the service can be provided to an access controller associated with the geofenced area and can be provided to an entity associated with the provision of the service. The passcode may be a single use passcode or the passcode can be a multi-use password for repeat requests for the service. Information associated with limits of the passcode may also be provided to the entity and the access controller. The information may specify a time limit associated with validity of the passcode, one or more time window restrictions for entry into the geofenced area, entry coordinates into the geofenced area, or other information.

The entity provides the passcode to the UAV assigned to provide the service. The UAV may be configured to not cross into a geofenced area without having access permission. Access permission to fly in or through a geofenced area may be granted to the UAV before flight of the UAV or may be granted from an access controller associated with the geofenced area during flight of the UAV. The access controller for the geofenced area may be configured to implement a reaction procedure (e.g., provide identification information associated with the UAV to appropriate authorities, capture the UAV, etc.) if an unauthorized UAV enters the geofenced area associated with the access controller.

When the UAV is near the boundary of the geofenced area associated with the destination location, the UAV sends an access request to the access controller that includes the passcode. Based on validation of the passcode, the access controller communicates access permission to the UAV so that the UAV is able to enter the geofenced area as an authorized UAV that does not cause the access controller to implement the reaction procedure for a period of time. The period of time that the UAV is an authorized UAV may be a time period included in the access request or a time period set by the access controller. The access permission may cause the UAV to add an identifier of the geofenced area to an exception list for the period of time. Adding the identifier of the geofenced area to the exception list allows the UAV to enter into the geofenced area and operate in the geofenced for the period of time. After expiration of the period of time, geofence enforcement instructions of the UAV may not allow the UAV to cross into the geofenced area or operate in the geofenced area. Technical benefits associated with the present disclosure include provision of a simple, efficient, traceable, and secure procedure to identify UAVs that are to provide requested services and to allow such UAVs access to a destination location within a geofenced area via permission provided by an access controller for the geofenced area.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple unmanned aerial vehicles (UAVs) 102 are illustrated and associated with reference number 102. When referring to a particular UAV that is authorized to be used in a geofenced area, the distinguishing letter "A" is used and when referring to a particular UAV that is unauthorized to be used in the geofenced area, the distinguishing letter "B" is used. However, when referring to any arbitrary UAV, or a UAV that is not in a geofenced area, the reference number 102 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority, order, or arrangement of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a block diagram of a system 100 to enable a UAV 102 to enter a geofenced area 104. The UAV 102 may provide a service at a destination location 108 in the geofenced area 104. In some implementations, the system 100 includes the UAV 102, a controller 110 for the UAV 102, a regional geofence database 112, and an access controller 114 associated with the geofenced area 104. The geofenced area 104 is defined by one or more boundaries 106. In other implementations, the system 100 includes additional components or fewer components. In the implementation of FIG. 1, a single geofenced area 104 is shown for simplicity with the understanding that additional geofenced areas 104 could be present.

The UAV 102 may include a propulsion system 116 configured to move and navigate the UAV 102, a transceiver 118 including a transmitter 120 and a receiver 122 configured to enable the UAV 102 to communicate with other devices, a sensor system 124 to provide data regarding operational conditions for the UAV 102, one or more processors 126, and a memory 128. The sensor system 124 may include one or more location systems 130 to provide location data to the one or more processors 126. The location data may be used to determine a location of the UAV 102

(e.g. a latitude, longitude, and elevation of the UAV 102). The one or more location systems 130 may include a global positioning system (GPS).

The one or more processors 126 may control operation of the UAV 102 during use. The memory 128 may store data 132 and instructions 134. The data 132 may include geofence data 136, an exception list 138, service data 140, and other data for operation of the UAV 102. The geofence data 136 includes an identifier of each geofenced area 104 within an operational range of the UAV 102, data describing boundaries 106 of each geofenced area 104 within the operational range, any limitations associated with the geofenced areas (e.g., temporal restrictions for a geofenced area, altitude limitations, etc.), or combinations thereof. Regional geofence data may be obtained from the regional geofence database 112. In some implementations, the controller 110 may access the regional geofence database 112 and provide regional geofence data applicable to the UAV 102 to the UAV 102 for storage as a portion of the geofence data 136. In some implementations, the UAV 102 accesses the regional geofence database 112 and retrieves regional geofence data applicable to the UAV 102 for storage as a portion of the geofence data 136. In addition, during flight of the UAV 102, the UAV 102 may receive local geofence data broadcast by one or more access controllers 114 associated with local geofenced areas. The UAV 102 may store received local geofence data as a portion of the geofence data 136.

The exception list 138 includes a list of geofence identifiers. For a UAV 102 that includes geofence enforcement instructions that prevent entry and operation in an unauthorized geofenced area, the exception list 138 can identify authorized geofenced areas. The UAV 102 may be able to enter and operate in an authorized geofenced area corresponding to a geofence identifier included in the exception list 138. In some aspects, the exception list 138 may include an expiration time for one or more of the geofence identifiers included in the exception list 138, temporal restrictions, and other restrictions associated with operation of the UAV 102 in the geofenced area. The processor(s) 126 can be configured to modify the exception list 138 in accordance with an expiration time or other restriction lapse. For example, the processor(s) 126 can be configured to remove a geofence identifier identifying an authorized geofenced area 104 from the exception list 138 after an authorization time elapses.

The service data 140 may include data associated with a service to be performed by the UAV 102. The service data 140 may identify the destination location 108 of the UAV 102, a route to the destination location 108, a passcode 142 associated with the service, an entity associated with provision of the service, coordinates for entry to the geofenced area 104 associated with the service, data taken in association with performance of the service (e.g., image data of a surveillance area or of a delivered item), other information, or combinations thereof. The UAV 102 may receive the service data 140 from the controller 110, from the UAV 102 itself, from the access controller 114 associated with the geofenced area 104, from other devices, or combinations thereof.

The passcode 142 may be associated with one or more restrictions. The restrictions may include an expiration time, one or more time windows during which the passcode is valid, other restrictions or combinations thereof. The restrictions for the passcode are saved in the service data and may be enforced by the UAV 102, by the access controller 114, or both. For example, if the restrictions for a particular passcode 142 prohibit entry into the geofenced area 104 during a lunch period (e.g., from 12 noon to 1 pm), the UAV 102 may generate and present an alert via the controller 110 when the UAV 102 determines that the UAV 102 will arrive at the geofenced area 104 during the prohibited time. An operator of the UAV 102 may change a start of flight time for the UAV 102 so that the UAV 102 will not arrive during the prohibited time period.

The instructions 134 may include one or more applications (e.g., programs, scripts, or other types of computer code) executable by the one or more processors to perform operations. The instructions 134 may include service code 144 to perform the service assigned to the UAV 102 and a flight application 146. The service code 144 may cause the UAV 102 to release a payload 148 at the destination location 108, may cause the UAV 102 to use a camera system 150 to take surveillance images of a particular object (e.g., a car or a roof of a house that is being examined for storm damage) or area in the geofenced area 104, may cause the UAV 102 to attach to a payload, may cause the UAV 102 to perform other operations associated with the service assigned to the UAV 102, or combinations thereof.

The flight application 146 controls operation of the UAV 102. In some implementations, the flight application 146 may include location instructions configured to determine a present location of the UAV 102, route instructions to determine a route to the destination location 108 that avoids crossing into unauthorized geofenced areas, awareness instructions to monitor and react to proximity of other UAVs 102 or objects, monitor instructions to provide flight data to the controller 110 via the transceiver 118, geofence enforcement instructions 152, and other instructions for operation of the UAV 102. The geofence enforcement instructions 152 may compare the present location of the UAV 102 to the geofence data 136 and the exception list 138 to determine if the UAV 102 is approaching an unauthorized geofenced area (e.g., a geofenced area where the identifier for the geofenced area is not included in the exception list 138). The geofence enforcement instructions 152 may prevent the UAV 102 from entering into an unauthorized geofence area, may provide a warning about a boundary 106 of a geofenced area 104 that will be crossed based on a current heading and speed, or combinations thereof.

When the UAV 102 approaches the geofenced area 104 associated with the destination location 108, even if the identifier of the geofenced area 104 is included in the exception list 138, the flight application 146 may cause the propulsion system 116 of the UAV 102 to slow forward progress toward the destination location 108, enter a hover mode (e.g., stop forward motion of the UAV 102) near a boundary 106 of the geofenced area 104 (e.g., 3 feet, 2 feet, 1 foot, or some other distance from the boundary 106), and send an access request to the access controller 114 associated with the geofenced area 104. The access request includes the passcode 142 associated with the service. Requesting entry permission to the geofenced area by the UAV 102 when the UAV 102 is an authorized UAV for the geofenced area 104 allows documentation by the UAV 102 and the access controller 114 of a service step completed during performance of the service assigned to the UAV 102.

The controller 110 may communicate with the UAV 102 and other devices via one or more interfaces 154. The controller 110 receives use data sent via the transmitter 120 during operation of the UAV 102 and displays processed use data associated with operation of the UAV 102 to a display 156. The processed use data may include image data from one or more cameras of the UAV 102, a map showing a location of the UAV 102, location data, air speed data, heading data, attitude data, fuel or power data, other types of data, or combinations thereof.

The controller 110 may include one or more processors 158 and a memory 160. The memory 160 includes instructions executable by the one or more processors 158 to control operation of the UAV 102 via commands sent from the one or more interfaces 154 to the receiver 122 of the UAV 102. Service data for the service the UAV 102 is to provide is sent to the UAV 102 from the controller 110 via the one or more interfaces 154. In some implementations, an operator uses the controller 110 to operate the UAV 102 during use of the UAV 102 to provide the service. In other implementations, the UAV 102 receives a flight initiation command from an operator and operates substantially autonomously from a start location to the destination location 108 and from the destination location 108 to a return location or additional destination location after completion of the service at the destination location 108. If the controller 110 receives unusual operation data from the UAV 102, an alert may be provided to the operator to allow the operator to take over control the UAV 102 via the controller 110. In some implementations, the controller 110 is a laptop computer, tablet computer, or other type of computer.

An access controller 114 may be associated with the geofenced area 104. The access controller 114 may grant or deny access to the geofenced area 104. In some implementations, the access controller is physically located in the geofenced area 104. In other implementations, the access controller is not physically located in the geofenced area 104.

An access controller 114 that is located in the geofenced area 104 or near the geofenced area 104 may broadcast information associated with the geofenced area 104 (e.g., boundaries 106 of the geofenced area 104) via one or more interfaces 162 when the geofenced area 104 is a local geofenced area. The access controller 114 may also broadcast access restrictions for the geofenced area 104 via the one or more interfaces 162.

The access controller 114 may include the one or more interfaces 162 to enable communication with other devices, one or more processors 164, and a memory 166. The memory may include data 168 and instructions 170. The data 168 may include local geofence boundary data and access restrictions, an authorization list 172 of identifiers of UAVs 102 allowed entry into the geofenced area associated with the access controller 114, a passcode list 174 and corresponding access restrictions for currently valid passcodes 142, a log of UAV entries into and UAV exits from the geofenced area 104 associated with the access controller 114, image data of UAVs 102 in the geofenced area 104, other information, or combinations thereof. Some entries in the authorization list 172 and some entries in the passcode list 174 can be associated with expiration times. The one or more processors 164 may remove entries from the authorization list 172 and the passcode list 174 that are determined to be expired based on corresponding expiration times.

The instructions 170 may include one or more applications (e.g., programs, scripts, or other types of computer code) executable by the one or more processors 164 to perform operations associated with the geofenced area 104. The instructions 170 may cause the access controller 114 to broadcast a signal via a particular interface of the one or more interfaces 154 that includes an identifier of the geofenced area 104, boundaries 106 of the geofenced area 104, and any restrictions associated with the geofenced area 104. The instructions may include a tracker system 176, a response system 178 configured to respond to unauthorized UAV entry into the geofenced area 104, an entry system 180, other systems, or combinations thereof.

The tracker system 176 is configured to identify UAVs 102 that are in the geofenced area 104 associated with the access controller 114 and determine whether the UAVs 102 are authorized UAVs 102A or unauthorized UAVs 102B. Authorized UAVs 102A are UAVs 102 with identifiers that are included in the authorization list 172. Unauthorized UAVs 102B are UAVs 102 with identifiers that are not included in the authorization list 172, which may include UAVs 102 that requested access permission to enter the geofenced area 104, were not granted access permission, and entered the geofenced area 104. Unauthorized UAVs 102B also may include UAVs 102 with identifiers not included in the authorization list 172 that entered the geofenced area without requesting access permission.

When an unauthorized UAV 102B enters the geofenced area 104, the tracker system 176 may activate one or more cameras 182 to take images of the unauthorized UAV 102B. The one or more cameras 182 may only be associated with the access controller 114 or may be part of another system (e.g., an alarm system) that the access controller 114 can utilize. The images may include timestamps, one or more landmarks that identify that the UAV 102B is in the geofenced area 104, other identifier information, or combinations thereof. The tracker system 176 may also activate the one or more cameras 182 to take images of authorized UAVs 102A in the geofenced area 104. The image data of UAVs 102 in the geofenced area 104 from the one or more cameras 182 and identifier information of the UAVs 102 may be saved as a portion of the data 168 in the memory 166 for a period of time (e.g., 3 days, 1 week, 1 month, or some other period of time). In some implementations, the data 168 can include log entries or other data indicative of a violation of the geofenced area 104 associated with the one or more unauthorized UAVs 102B. In some implementations, the data 168 may include log entries or other data indicative of entry into and exit from the geofenced area of authorized UAVs 102A, unauthorized UAVs 102B, or both.

The tracker system 176 may receive via the one or more interfaces 162 identification information transmitted by UAVs 102 in a vicinity of the geofenced area 104 and may periodically record at least a portion of the identification information. The identification information may include a UAV identifier, location of the UAV 102, velocity of the UAV 102, a location of the controller 110 for the UAV 102, a time mark, and a status of the UAV 102. The tracker system 176 may determine if the location of a UAV 102 is within the geofenced area 104 associated with the access controller 114. If the UAV 102 is within the geofenced area 104, the tracker system 176 determines if the UAV identifier associated with the UAV 102 is an identifier included in the authorization list 172. If the UAV identifier is not included in the authorization list 172, the tracker system 176 may provide information associated with the UAV 102 to the response system 178. The information associated with the UAV 102 may include an identifier of the UAV 102 and image data associated with the UAV 102 taken by the one or more cameras 182.

The response system 178 is configured to respond to an unauthorized UAV 102B in the geofenced area 104. A response instigated by the response system 178 may include sending an alert to a person associated with the access controller 114 via the one or more interfaces 162, may include sending an alert to one or more appropriate authorities (e.g., local law enforcement, an aviation authority, etc.) via the one or more interfaces 162, may include initiating active measures to capture or impede the UAV 102, or combinations thereof. An alert sent to the person associated with the access controller 114, or an alert sent to the one or more appropriate authorities, may include a time that the unauthorized UAV 102B entered the geofenced area 104, may include identification information associated with the unauthorized UAV 102B, may include image data of the UAV 102B, or combinations thereof. The response system 178 may also send a second alert to the person associated with the access controller 114, a second alert to the one or more appropriate authorities, or both, when the unauthorized UAV 102 exits the geofenced area 104 and does not enter the geofenced area 104 again for a period of time (e.g., 5 seconds, 10 seconds, or some other period of time).

The entry system 180 may receive an access request transmitted by a transmitter 120 of a UAV 102. The access request may include a passcode 142, a time period for operation of the UAV 102 in the geofenced area, an entity associated with the UAV 102, other information, or combinations thereof. The entry system 180 validates that the passcode 142 based on information in the passcode list 174 and based on any restrictions associated with the geofenced area 104. When the passcode 142 is validated and no restrictions would be violated, the access controller 114 adds the identifier of the UAV 102 to the authorization list 172 and sends access permission to the UAV 102. The access permission may be sent from the one or more interfaces 154 directly to the receiver 122 of the UAV 102, to the controller 110 for the UAV 102, to an entity associated with the UAV 102 determined from the entry request or from the identification information, or combinations thereof. The identifier of the UAV 102 may remain in the authorization list 172 for the period of time specified in the access request or for another period of time specified by the access controller 114.

The access permission may include data that updates the destination location to an updated destination location. For example, an original destination location 108 may be a general location located in the geofenced area, and the updated destination location may be a designated delivery area within the geofenced area 104. The UAV 102 may replace the destination location with the updated destination location after the UAV 102 receives the access permission. In addition, the access permission may include an entry path from the boundary to the destination location, may include an exit path from the destination location out of the geofenced area 104, or both. The UAV 102 causes the propulsion system 116 to utilize the entry path, exit path, or both, provided in the access permission.

In some implementations, the access controller checks that no restrictions associated with the passcode 142 or the geofence area 104 are violated and implements an additional security procedure of having the UAV 102 provide a one-time access code to the access controller 114. The access controller generates a one-time access code (e.g., a 6 digit number) and sends the one-time access code to a device associated with the UAV 102 (e.g., the controller 110 or to a device of the entity associated with the UAV 102). The device may send the one-time access code to the UAV 102, and the UAV 102 provides the one-time access code to the access controller 114. When the one-time access code is provided to the access controller 114, the access controller 114 grants access permission to the UAV by adding an identifier of the UAV 102 to the authorization list 172 and sending access permission to the UAV 102.

In some implementations, the access permission may include entry information, exit information, or both. The entry information may specify an entry location to cross the boundary 106 into the geofenced area 104 and a route from the entry location to the destination location 108. The exit information may specify a route from the destination location 108 past the boundary 106 for the geofenced area 104.

When the passcode 142 is not validated by the entry system 180, the access controller 114 may ignore the entry request, may send an access denial message, may send an access denial alert to a representative associated with the geofenced area 104, or combinations thereof. If an access denial alert is sent to the representative, the access denial alert may be a part of a graphical user interface that enables the representative to accept the denial, override the denial, contact an entity associated with UAV, or combinations thereof. The access denial message may be sent to the UAV 102, to a device associated with the UAV determined from the entry request or the identification information transmitted by the UAV, or both.

In some implementations of the system 100, a requestor requests a service from a service provider (e.g., food delivery, medication delivery, damage inspection, pick-up of an item for repair or some other purpose, etc.). The requestor may make the request via a webpage or by talking or otherwise communicating with a representative of the service provider. The requestor requests, or agrees to, provision of the service via a UAV 102 and informs the service provider that destination location 108 for the service is in a geofenced area 104. The requestor informs the service provider of the destination location 108 provides a passcode 142 for the service and provides, or agrees to provide, the passcode 142 to an access controller 114 for the geofenced area 104. In other implementations of the system 100, a first person associated with the geofenced area provides a passcode to a second person associated with the UAV 102, and to the access controller 114, to enable the second person to fly the UAV 102 recreationally within the geofenced area 104. The destination location provided to the second person is any location within the geofenced area.

The UAV 102 may be owned by the service provider or may be owned by another entity that provides UAV services. The UAV 102 is located, or moved to a start location within an operational range of the destination location 108. The UAV 102 is provided with service data 140 associated with performance of the service. The service data includes the destination location 108, the passcode 142, a return location, service performance information and instructions, and other information. The UAV 102 receives regional geofence data from the regional geofence database 112 and a route is selected to the destination location. Flight of the UAV 102 to the destination location 108 is initiated. The UAV 102 may receive updated regional geofence data from the regional geofence database 112 and local geofence data from access controllers 114 and may update the geofence data 136 in the memory of the UAV 102. If needed, the route to the destination location 108 may be adjusted based on updates to the geofence data, detected obstructions, detected UAVs 102, or other information received by the UAV 102.

When the UAV 102 nears the destination location 108, the UAV 102 may slow and enter a hover mode near a boundary 106 of the geofenced area 104 associated with the destination location 108. The UAV 102 sends an access request to the access controller 114 associated with the geofenced area. The access request includes the passcode 142, identification information associated with the service provider, identification information associated with the provider of the UAV 102, other information, or combinations thereof. The access controller 114 also receives UAV identification information broadcast by the UAV 102.

The access controller 114 determines whether to grant or deny the access request based on the passcode 142, other information included in the access request, the identification information broadcast by the UAV 102, or combinations thereof. When the access controller 114 determines to grant the UAV 102 access to the geofenced area 104, the access controller 114 adds an identifier of the UAV to the authorization list 172 and sends access permission to the UAV 102. The access permission may be sent directly to the UAV 102 or may sent to the UAV 102 via one or more other devices (e.g., the controller 110 of the UAV 102). When the access controller 114 determines to deny access permission, the access controller 114 may ignore the access request or send a denied access message to the UAV 102.

When the UAV 102 receives access permission to the geofenced area 104, the UAV 102 adds an identifier of the geofenced area 104 to the exception list 138 if the identifier of the geofenced area 104 is not already in the exception list 138, and the propulsion system 116 of the UAV 102 is engaged to move the UAV 102 into the geofenced area 104 to the destination location 108 so that the UAV 102 can provide the service. After the UAV 102 provides the service, the UAV 102 determines a route to a return location and proceeds to the return location.

When the UAV 102 receives a denial of access or after passage of a period of time (e.g., 2 minutes, 3 minutes, or some other time period) after sending the access request, the UAV may send an access denied alert to the controller 110. The UAV 102 may continue in the hover mode until the UAV 102 receives additional instructions from the controller 110 and implements the instructions.

FIG. 2 depicts a flowchart of method 200 for a UAV 102 to acquire access permission to enter a geofenced area 104 associated with a destination location 108 of the UAV 102. The method 200 may be performed by the UAV 102 of FIG. 1. The method 200, at block 202, includes receiving service data 140 at the UAV 102. The service data 140 includes a destination location 108 for the UAV 102 and a passcode 142.

The method 200 includes, at block 204, receiving regional geofence data. The UAV 102 may receive the regional geofence data from a controller of the UAV 102, or the UAV may request the regional geofenced data from a regional geofence database 112. The UAV may store the regional geofence data as a portion of geofence data 136 in the memory 128 of the UAV 102.

The method 200 includes, at block 206, determining a route to the destination location 108. The method 200 includes, at block 208, initiating flight to the destination location 108. During the flight, the UAV 102 may receive updated regional geofence data from the regional geofence database 112 and may receive local geofence data from one or more access controllers. The UAV 102 may add the updated regional geofence data and the local geofence data to the geofence data 136. During the flight to the destination location 108, the UAV 102 may adjust the route to accommodate changed circumstances.

The method 200 includes, at decision block 210, determining if the UAV is approaching a geofenced area 104 associated with the destination location 108. When the determination, at decision block 210, is that the UAV is not approaching a boundary 106 (e.g., within 30 feet or some other distance of the boundary) of the geofenced area 104 associated with the destination location, the UAV 102 continues the flight to the destination location 108.

When the determination, at decision block 210, is that the UAV is approaching the boundary 106; the method, at block 212, entering a hover mode near the boundary. The method 200, at block 214, includes sending an access request to an access controller 114 associated with the geofenced area 104.

The method, at decision block 216, includes determining if the UAV 102 receives access permission to enter the geofenced area from the access controller 114. If the determination at decision block 216 is that the access permission is not granted; the method 200 includes, at block 218, sending a request for further instructions to a controller 110 for the UAV 102, and the method 200 ends at block 220.

If the determination at decision block 216 is that the UAV 102 received access permission; the method 200, at block 222, includes adding an identifier of the geofenced area to an exception list 138. The method 200, at block 224, includes engaging a propulsion system 116 of the UAV 102 to proceed across the boundary 106 to the destination location and perform a service associated with the service data. The method 200, at block 226, also includes leaving the geofenced area 104 to fly to a return location. The method 200 ends at block 220. Although the method 200 is illustrated as including a certain number of steps, more, fewer, and/or different steps can be included in the method 200 without departing from the scope of the subject disclosure.

FIG. 3 depicts a flowchart of a method 300 for an access controller 114 to grant or deny access to a UAV 102 to fly in a geofenced area associated with the access controller 114. The method 300 may be performed by the access controller 114 of FIG. 1. The method 300, at block 302, includes adding a first passcode to a passcode list 174 in a memory 160 of the access controller 114.

The method 300 includes, at block 304, receiving UAV identification information broadcast by a UAV 102. The method 300 includes, at block 306, receiving an access request from the UAV 102. The access request includes a second passcode 142, which may be the same as the first passcode. The UAV 102 may be in a hover mode near a boundary of the geofenced area when the UAV 102 sends the access request. The method 300, includes at decision block 308, determining whether to grant access to the geofenced area 104. A determination to grant or deny access to the geofenced area 104 may be based on presence of the second passcode in the passcode list 174, based on satisfaction of one or more conditions associated with the second passcode 142 (e.g., first time window limitations), based on one or more conditions associated with the geofenced area 104 (e.g., second time window limitations), or combinations thereof.

When the determination at decision block 308 is to grant access to the geofenced area 104; the method 300, at block 310, includes sending access permission to the UAV 102. The access permission may be sent directly to the UAV 102 from the access controller 114, or the access permission may be sent to another device (e.g., the controller 110 for the UAV 102), which forwards the access permission to the UAV 102. The method 300 may optionally include, at block 312, adding an identifier of the UAV 102 to an authorization list 172 of the access controller 114. Adding the identifier of the UAV 102 may not be needed if the identifier is already in the authorization list 172. The identifier of the UAV 102 may stay in the authorization list 172 for a period of time included in the access request, or for a period of time determined by the access controller 114 as sufficient time for the UAV 102 to provide the service. When the identifier of the UAV 102 is added to the authorization list 172, the UAV 102 may operate in the geofenced area 104 associated with the access controller 114 without being identified as an unauthorized UAV. The method 300, then ends at block 314.

When the determination at decision block 308 is to deny access of the UAV 102 to the geofenced area 104; the method 300, at block 316, includes ignoring the UAV 102, sending an access denial alert to a representative associated with the geofenced area 104, or sending a denial message to the UAV 102. The method 300 then ends at block 314. Although the method 300 is illustrated as including a certain number of steps, more, fewer, and/or different steps can be included in the method 300 without departing from the scope of the subject disclosure.

Figure 4:
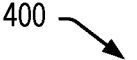
FIG. 4 is a diagram of a representation of a computing device.

FIG. 4 is an illustration of a block diagram of a computing environment 400 including a computing device 402 configured to support implementations of computer-implemented methods and computer-executable program instructions (or code) according to the present disclosure. For example, the computing device 402, or portions thereof, may execute instructions to perform, or cause equipment to perform, operations described with reference to FIGS. 1-3. In an implementation, the computing device 402 is, or is a component of, the UAV 102, the controller 110, the regional geofence database 112, and the access controller 114 of FIG. 1.

The computing device 402 includes one or more processors 404. The processor(s) 404 communicate with a system memory 406, one or more storage devices 408, one or more input/output interfaces 410, one or more communications interfaces 412, or a combination thereof. The system memory 406 includes non-transitory computer readable media, including volatile memory devices (e.g., random access memory (RAM) devices), nonvolatile memory devices (e.g., read-only memory (ROM) devices, programmable read-only memory, and flash memory), or both. The system memory 406 includes an operating system 414, which may include a basic input/output system for booting the computing device 402 as well as a full operating system to enable the computing device 402 to interact with users, other programs, and other devices. The system memory 406 includes one or more applications 416 (e.g., instructions) which are executable by the processor(s) 404. For example, when the computing device 402 is the UAV 102, the one or more applications 416 include the service code 144 and the flight application 146, and when the computing device 402 is the access controller 121, the one or more applications include the tracker system 176, the response system 178, and the entry system 180.

The processor(s) 404 communicate with the one or more storage devices 408. For example, the one or more storage devices 408 are non-transitory computer readable media that can include nonvolatile storage devices, such as magnetic disks, optical disks, or flash memory devices. The storage devices 408 can include both removable and non-removable memory devices. The storage devices 408 can be configured to store an operating system, images of operating systems, applications, and program data. In particular implementations, the system memory 406, the storage devices 408, or both, include tangible computer-readable media incorporated in hardware and which are not signals.

The processor(s) 404 communicate with the one or more input/output interfaces 410 that enable the computing device 402 to communicate with one or more input/output devices 418 to facilitate user interaction. The input/output interfaces 410 can include serial interfaces (e.g., universal serial bus (USB) interfaces or Institute of Electrical and Electronics Engineers (IEEE) 1404 interfaces), parallel interfaces, display adapters, audio adapters, and other interfaces. The input/output devices 418 can include keyboards, pointing devices, displays (e.g., one or more monitors, one or more gauges, etc.), speakers, microphones, touch screens, rotatable selectors, levers, knobs, slides, switches, and other devices. The processor(s) 404 detect interaction events based on user input received via the input/output interfaces 410. Additionally, the processor(s) 404 send a display to a display device via the input/output interfaces 410.

The processor(s) 404 can communicate with one or more devices 420 via the one or more communications interfaces 412. The one or more devices 420 can include external computing devices contacted via a communication network and controllers, sensors, and other devices coupled to the computing device 402 via wired or wireless local connections. The one or more communications interfaces 412 may include wired Ethernet interfaces, IEEE 802 wireless interfaces, other wireless communication interfaces, one or more converters to convert analog signals to digital signals, electrical signals to optical signals, one or more converters to convert received optical signals to electrical signals, or other network interfaces.

Aspects of the disclosure are described further with reference to the following set of interrelated clauses:

According to Clause 1, an unmanned aerial vehicle includes a propulsion system; a processor; a transmitter coupled to the processor; a memory coupled to the processor, the memory comprising instructions executable by the processor to: in response to a determination that the unmanned aerial vehicle is near a boundary of a geofenced area associated with a destination of the unmanned aerial vehicle, send an access request, via the transmitter, to an access controller associated with the geofenced area; receive, at the receiver in response to the access request, access permission; and responsive to receiving the access permission, engage the propulsion system to proceed across the boundary.

Clause 2 includes the unmanned aerial vehicle of Clause 1, and further includes a location system coupled to the processor to provide location data to the processor.

Clause 3 includes the unmanned aerial vehicle of Clause 1 or Clause 2, wherein the access request includes a passcode, and wherein the receiver receives the access permission from the access controller in response to verification of the passcode by the access controller.

Clause 4 includes the unmanned aerial vehicle of Clause 3, wherein the passcode enables entry past the boundary during a particular time window.

Clause 5 includes the unmanned aerial vehicle of Clause 3 or Clause 4, wherein the passcode is associated with a particular entity, and wherein the access request includes an identifier of the particular entity.

Clause 6 includes the unmanned aerial vehicle of any of Clauses 1 to 5, wherein particular geofence data associated with the boundary is received by the receiver from the access controller.

Clause 7 includes the unmanned aerial vehicle of any of Clauses 1 to 6, wherein geofence data associated with the boundary is received by the receiver from the access controller.

Clause 8 includes the unmanned aerial vehicle of any of Clauses 1 to 7, wherein the instructions are further executable by the processor to, in response to the determination that the unmanned aerial vehicle is near the boundary of the geofenced area, cause the propulsion system to stop forward motion of the unmanned aerial vehicle.

Clause 9 includes the unmanned aerial vehicle of any of Clauses 1 to 8, wherein the instructions are further executable by the processor to: receive from a device associated with the unmanned aerial vehicle a one-time access code, the one-time access code sent by the access controller to the device in response to receipt by the access controller of the access request; and provide, via the transmitter, the one-time access code to the access controller to enable receipt of the access permission.

Clause 10 includes the unmanned aerial vehicle of any of Clauses 1 to 9, wherein the access permission is received at the receiver from a device associated with the unmanned aerial vehicle.

Clause 11 includes the unmanned aerial vehicle of any of Clauses 1 to 10, further comprising a payload, wherein the instructions are further executable by the processor to release the payload in response to arrival at the destination location.

Clause 12 includes the unmanned aerial vehicle of any of Clauses 1 to 11, further comprising a camera system, wherein the instructions are further executable by the processor to take surveillance images via the camera system in response to arrival at the destination location.

Clause 13 includes the unmanned aerial vehicle of any of Clauses 1 to 12, wherein the access permission includes an updated destination location, and wherein the instructions are further executable by the processor to replace the destination location with the updated destination location.

Clause 14 includes the unmanned aerial vehicle of any of Clauses 1 to 13, wherein the access permission further includes an entry path to the destination location, and wherein the instructions are further executable by the processor to cause the propulsion system to proceed to the updated destination via the entry path.

Clause 15 includes the unmanned aerial vehicle of any of Clauses 1 to 14, wherein the access permission further includes an exit path away from the destination location, and wherein the instructions are further executable by the processor to cause the propulsion system to proceed away from the destination location via the exit path.

According to Clause 16, a non-transitory computer-readable medium comprising instructions executable by one or more processors of an unmanned aerial vehicle to: in response to a determination that the unmanned aerial vehicle is near a boundary of a geofenced area associated with a destination location of the unmanned aerial vehicle, cause a transmitter to send an access request to an access controller associated with the geofenced area; and in response receipt of access permission, engage a propulsion system of the unmanned aerial vehicle to proceed across the boundary.

Clause 17 includes the non-transitory computer-readable medium of Clause 16, wherein the instructions are further executable by the one or more processors to add an identifier of the geofenced area to an exception list based on receipt of the access permission, wherein presence of the identifier in the exception list enables the unmanned aerial vehicle to enter the geofenced area.

Clause 18 includes the non-transitory computer-readable medium of Clause 16 or Clause 17, wherein the instructions are further executable by the one or more processors to receive regional geofence data from a regional geofence database.

According to Clause 19, a method includes receiving, at an access controller associated with a geofenced area, identification information broadcast by an unmanned aerial vehicle; receiving, at the access controller, an access request from the unmanned aerial vehicle, wherein the access request includes a passcode; determining, at the access controller based on the passcode, whether to grant the unmanned aerial vehicle access to the geofenced area; and based on a determination to grant the unmanned aerial vehicle access to the geofenced area, adding an identifier of the unmanned aerial vehicle to an authorization list of unmanned aerial vehicles allowed entry to the geofenced area and sending, from the access controller to the unmanned aerial vehicle, access permission to the unmanned aerial vehicle.

Clause 20 includes the method of Clause 19, further comprising, based on a determination to deny the unmanned aerial vehicle access to the geofenced area, sending an access denial alert to a representative of associated with the geofenced area.

According to claims 21, a method includes, in response to a determination, by a processor of an unmanned aerial vehicle, that the unmanned aerial vehicle is near a boundary of a geofenced area associated with a destination of the unmanned aerial vehicle, sending an access request to an access controller associated with the geofenced area; receiving, at a receiver of the unmanned aerial vehicle, access permission; and, responsive to receiving the access permission, causing the unmanned aerial vehicle to enter the geofenced area.

According to Clause 22, an unmanned aerial vehicle includes means to propel the unmanned aerial vehicle; communication means to send and receive data; means to determine that the unmanned vehicle is near a boundary of a geofenced area associated with a destination of the unmanned aerial vehicle; includes means to cause the communication means to send an access request to an access controller associated with the geofenced area responsive to the means to determine indicating that the unmanned aerial vehicle is near the boundary; means to receive from the communication means access permission; and means to cause the means to propel the aircraft to proceed across the boundary.

According to Clause 23, a method includes, in response to a determination by a processor of an unmanned aerial vehicle that the unmanned aerial vehicle is near a boundary of a geofenced area associated with a destination location of the unmanned aerial vehicle, causing a transmitter to send an access request to an access controller associated with the geofenced area; and, in response to the processor receiving access permission, causing, via the processor, a propulsion system of the unmanned aerial vehicle to proceed across the boundary.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:
1. An unmanned aerial vehicle comprising:
a propulsion system;
a processor;
a transmitter coupled to the processor;
a receiver coupled to the processor; and a memory coupled to the processor, the memory comprising instructions executable by the processor to:
in response to a determination that the unmanned aerial vehicle is near a boundary of a geofenced area associated with a destination location of the unmanned aerial vehicle, send an access request and first identification information associated with the unmanned aerial vehicle, via the transmitter, to an access controller associated with the geofenced area, wherein the access request includes a passcode associated with a service to be performed by the unmanned aerial vehicle, second identification information associated with a service provider, and third identification information associated with a provider of the unmanned aerial vehicle, and wherein the access controller determines whether to grant access based on the passcode, the first identification information associated with the unmanned aerial vehicle, the second identification information associated with the service provider, and the third identification information associated with the provider of the unmanned aerial vehicle;
receive, via the receiver, access permission to the geofenced area; and
responsive to receipt of the access permission, engage the propulsion system to proceed across the boundary.

2. The unmanned aerial vehicle of claim 1, further comprising a location system coupled to the processor and configured to provide location data to the processor.

3. The unmanned aerial vehicle of claim 1, wherein the instructions are further executable by the processor to add an identifier of the geofenced area to an exception list based on receipt of the access permission, and wherein presence of the identifier in the exception list enables the unmanned aerial vehicle to enter the geofenced area.

4. The unmanned aerial vehicle of claim 1, wherein the passcode enables entry past the boundary during a particular time window.

5. The unmanned aerial vehicle of claim 1, wherein the instructions are further executable by the processor to generate an alert based on a determination that arrival at the geofenced area would occur during a prohibited time period associated with the passcode.

6. The unmanned aerial vehicle of claim 1, wherein particular geofence data associated with the boundary is received by the receiver from the access controller.

7. The unmanned aerial vehicle of claim 1, wherein particular geofence data associated with the boundary is received by the receiver from a geofence database based on a location of the unmanned aerial vehicle.

8. The unmanned aerial vehicle of claim 1, wherein the instructions are further executable by the processor to, in response to the determination that the unmanned aerial vehicle is near the boundary of the geofenced area, cause the propulsion system to stop forward motion of the unmanned aerial vehicle.

9. The unmanned aerial vehicle of claim 1, wherein the access permission is received at the receiver from a device associated with the unmanned aerial vehicle.

10. The unmanned aerial vehicle of claim 1, wherein the instructions are further executable by the processor to remove a geofence identifier from an exception list after an authorization time elapses.

11. The unmanned aerial vehicle of claim 1, further comprising a payload, wherein the instructions are further executable by the processor to release the payload in response to arrival at the destination location.

12. The unmanned aerial vehicle of claim 1, further comprising a camera system, wherein the instructions are further executable by the processor to take surveillance images via the camera system in response to arrival at the destination location.

13. The unmanned aerial vehicle of claim 1, wherein the access permission includes an updated destination location, and wherein the instructions are further executable by the processor to replace the destination location with the updated destination location.

14. The unmanned aerial vehicle of claim 1, wherein the access permission further includes an entry path to the destination location, and wherein the instructions are further executable by the processor to cause the propulsion system to proceed to the destination location via the entry path.

15. The unmanned aerial vehicle of claim 1, wherein the access permission further includes an exit path away from the destination location, and wherein the instructions are further executable by the processor to cause the propulsion system to proceed away from the destination location via the exit path.

16. A non-transitory computer-readable medium comprising instructions executable by one or more processors of an unmanned aerial vehicle to:

in response to a determination that the unmanned aerial vehicle is near a boundary of a geofenced area associated with a destination location of the unmanned aerial vehicle, cause a transmitter to send an access request and first identification information associated with the unmanned aerial vehicle to an access controller associated with the geofenced area, wherein the access request includes a passcode associated with a service to be performed by the unmanned aerial vehicle, second identification information associated with a service provider, and third identification information associated with a provider of the unmanned aerial vehicle, and wherein the access controller determines whether to grant access based on the passcode, the first identification information associated with the unmanned aerial vehicle, the second identification information associated with the service provider, and the third identification information associated with the provider of the unmanned aerial vehicle;

receive access permission to the geofenced area; and in response to receipt of the access permission, engage a propulsion system of the unmanned aerial vehicle to proceed across the boundary.

17. The non-transitory computer-readable medium of claim 16, wherein the instructions are further executable by the one or more processors to add an identifier of the geofenced area to an exception list based on receipt of the access permission, wherein presence of the identifier in the exception list enables the unmanned aerial vehicle to enter the geofenced area.

18. The non-transitory computer-readable medium of claim 16, wherein the instructions are further executable by the one or more processors to receive regional geofence data from a regional geofence database.

19. A method comprising:

receiving, at an access controller associated with a geofenced area, first identification information broadcast by an unmanned aerial vehicle;

receiving, at the access controller, an access request from the unmanned aerial vehicle, wherein the access request includes a passcode associated with a service to be performed by the unmanned aerial vehicle, second identification information associated with a service provider, and third identification information associated with a provider of the unmanned aerial vehicle;

determining, by the access controller based on the passcode, the first identification information broadcast by the unmanned aerial vehicle, the second identification information associated with the service provider, and the third identification information associated with the provider of the unmanned aerial vehicle, whether to grant the unmanned aerial vehicle access to the geofenced area; and sending, from the access controller to the unmanned aerial vehicle, access permission based on the determination to grant access.

20. The method of claim 19, further comprising, based on a determination to deny the unmanned aerial vehicle access to the geofenced area, sending an access denial alert to a representative associated with the geofenced area.

* * * * *